United States Patent [19]

Uchida

[11] Patent Number: 5,504,869
[45] Date of Patent: Apr. 2, 1996

[54] HIGH SPEED PROCESSING SYSTEM CAPABLE OF EXECUTING STRINGS OF INSTRUCTIONS IN ORDER WITHOUT WAITING COMPLETION OF PREVIOUS MEMORY ACCESS INSTRUCTION

[75] Inventor: Kaoru Uchida, Tokyo, Japan

[73] Assignee: NEC Corporation, Tokyo, Japan

[21] Appl. No.: 275,389

[22] Filed: Jul. 15, 1994

[30] Foreign Application Priority Data

Jul. 16, 1993 [JP] Japan .................................. 5-197754

[51] Int. Cl.⁶ .................................................. G06F 9/30
[52] U.S. Cl. .................. 395/375; 364/262.4; 364/262.81
[58] Field of Search .............................................. 395/375

[56] References Cited

U.S. PATENT DOCUMENTS

| | | | |
|---|---|---|---|
| 4,991,090 | 2/1991 | Emma et al. | 395/375 |
| 5,185,868 | 2/1993 | Tran | 395/375 |
| 5,185,871 | 2/1993 | Frey et al. | 395/375 |
| 5,241,635 | 8/1993 | Papadopoulos et al. | 395/375 |

OTHER PUBLICATIONS

Sohi; "Instruction Issue Logic for High-Performance, Interruptible, Multiple Functional Unit, Pipelined Computers"; IEEE Transactions on Computers, vol. 39, No. 3, Mar. 1990, pp. 349–359.

Hwu et al; "Checkpoint Repair for Out-of-Order Execution Machines"; 1987–ACM–0084–7495, pp. 18–26.

Smith; "Implementing Precise Interrupts in Pipelined Processors"; IEEE Transactions on Computers, vol. 37, No. 5, May 1988, pp. 562–573.

Primary Examiner—Krisna Lim
Attorney, Agent, or Firm—Whitham, Curtis, Whitham & McGinn

[57] ABSTRACT

An information processing system has a plurality of instruction strings containing a plurality of instructions and progressing process by executing instructions in one of the instruction strings in order. The system executes instructions in the instruction string in order on the basis of a control token set a start address, per each instruction string. In execution of an instruction for loading data from external memory, a next instruction is fed to the arithmetic processing unit without waiting completion of load operation in execution of the instruction for loading data from the external memory, and the currently executed instruction string is interrupted with storing a control token including a resume address of the interrupted instruction string in the token storing memory when data is not loaded in the data register in execution of the instruction for performing arithmetic operation with respect to the data in the data register.

13 Claims, 13 Drawing Sheets

FIG. 10
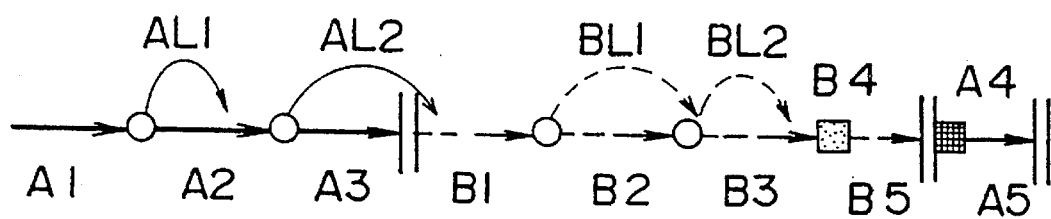
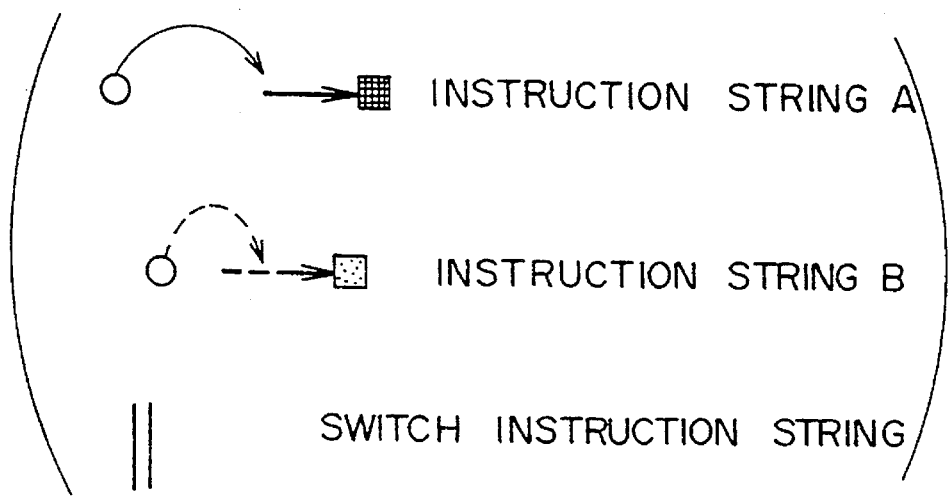

F I G. 1 8
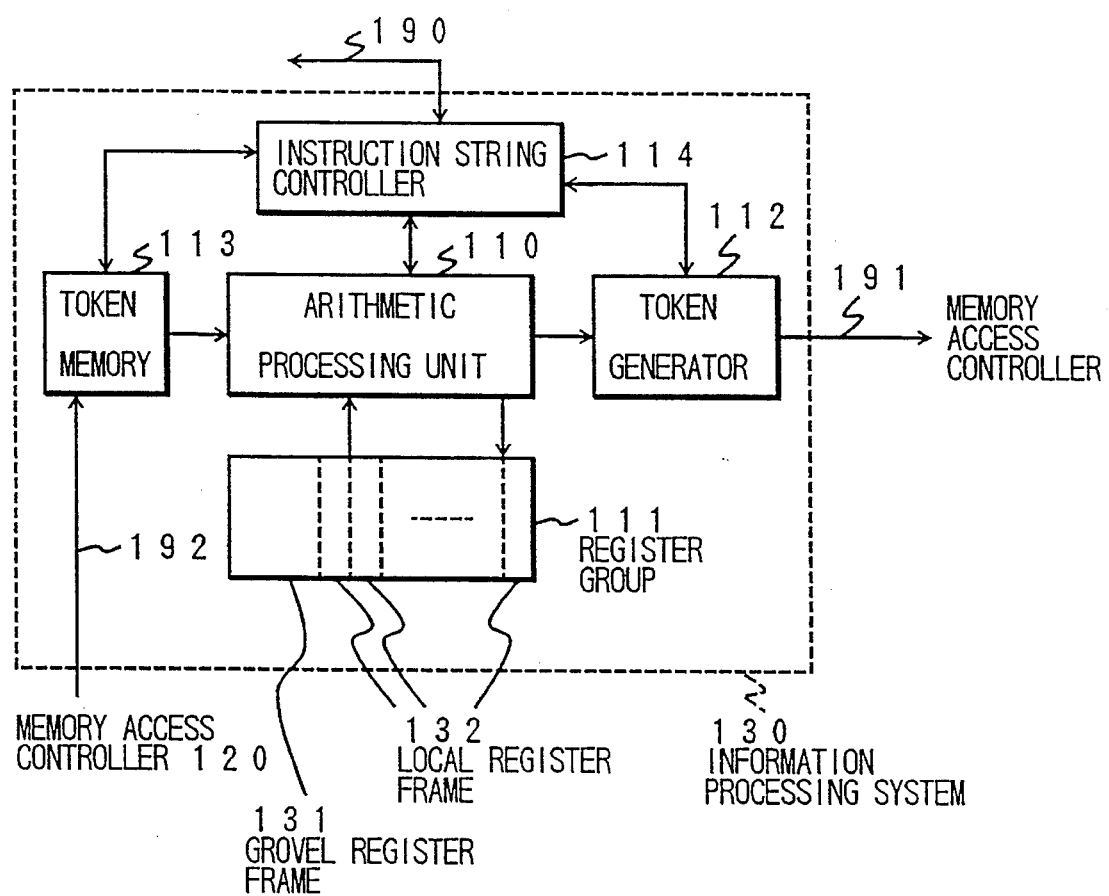

HIGH SPEED PROCESSING SYSTEM CAPABLE OF EXECUTING STRINGS OF INSTRUCTIONS IN ORDER WITHOUT WAITING COMPLETION OF PREVIOUS MEMORY ACCESS INSTRUCTION

BACKGROUND OF THE INVENTION

1. Field of the Invention

The present invention relates to an information processing system and method therefor. More specifically, the invention relates to an information processing system and method for high speed processing of instructions.

2. Description of the Related Art

In a conventional information processing system operative under von Neumann system, when an instruction for accessing a memory is processed during sequential execution of instruction string, it takes a control architecture not to advance the process operation in an arithmetic portion to the next instruction until memory access is completed and to place the system in a waiting state during a memory access cycle of the corresponding instruction.

Particularly, in the case where the memory access is performed in execution of an instruction for a data reading operation (loading operation), it is inherent to place arithmetic process into waiting state since the loaded data is used in execution of instructions subsequent to the load instruction of data read out from the memory.

Progress of instruction processing in the conventional von Neumann type processor will be briefly discussed hereinafter with reference to FIG. 19. In an instruction string A of FIG. 19, partial instruction strings A1, A2, A3, an arithmetic logic operation instruction (hereinafter referred to as ALU operation instruction) A4 and a partial instruction string A5 are executed in series. In order to execute the ALU operation instruction, two data loading, i.e. load AL1 after partial instruction string A1 and load AL2 after partial instruction string A2 are necessary. In FIG. 19, the portions indicated by curved arrows represent the period from initiation to completion of data loading. Similarly in case of an instruction string B, partial instruction strings B1, B2, B3, ALU operation instruction B4 and a partial instruction string B5 are executed in series. Also, for execution of the ALU operation instruction B4, data loading of two data, i.e. loads BL1 and BL2 is required.

In the conventional von Neumann type processor, when such instruction string is to be executed, the process cannot be advanced to the instruction string A2 subsequent to completion of the instruction string A1 unless data loading of the load AL1 to be used in the ALU operation instruction A4 is completed. During this period, the arithmetic unit is held inoperative and maintained in the waiting state for completion of the loading process. Therefore, the process of instruction string is progressed in the sequence of FIG. 19.

As shown in FIG. 19, in the typical conventional von neumann type information processing system, it is not possible to perform parallel execution at the instruction level. Accordingly, in the conventional system, when a period from initiation of memory access to completion is long relative to a period for executing one instruction of the information processing system, there is inherently arisen a period wasted without performing the arithmetic operation in the information processing system to degrade throughput of the information processing system.

SUMMARY OF THE INVENTION

Therefore, it is an object of the present invention to provide an information processing system and method which can eliminate a waiting period until memory access is completed in execution of memory access instruction.

Another object of the present invention is to remarkably improve process performance of a distributed memory type parallel processing information processing system, in which number of cycles for memory access becomes very large.

According to one aspect of the invention, an information processing system having a plurality of instruction strings containing a plurality of instructions and progressing process by executing instructions in one of the instruction strings in order, comprises:

token storing memory for storing control tokens, each being set a start address, per each instruction string;

arithmetic processing unit for executing instructions in the instruction string from the start address in the control token fed from the token storing memory;

register group consisting of a plurality of registers for storing data to be accessed by the arithmetic processing unit;

load controller for receiving loaded data and writing in data register in the register group during execution of instruction for loading data from an external memory; and instruction sting controller for feeding next instruction to the arithmetic processing unit without waiting completion of load operation in execution of the instruction for loading data from the external memory, interrupting execution of the currently executed instruction string and feeding the control token of another instruction string to the arithmetic processing portion and storing a control token including a resume address of the interrupted instruction string in the token storing means when data is not loaded in the data register in execution of the instruction for performing arithmetic operation with respect to the data in the data register.

Other objects, features, advantages of the present invention will become clear from the detailed description given hereinafter.

BRIEF DESCRIPTION OF THE DRAWING

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 10 is a timing chart showing an instruction processing sequence in the first embodiment of the information processing system;

FIG. 18 is a block diagram showing a construction of the fifth embodiment of an information processing system according to the invention;

DESCRIPTION OF THE PREFERRED EMBODIMENT

The preferred embodiments of an information processing system according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
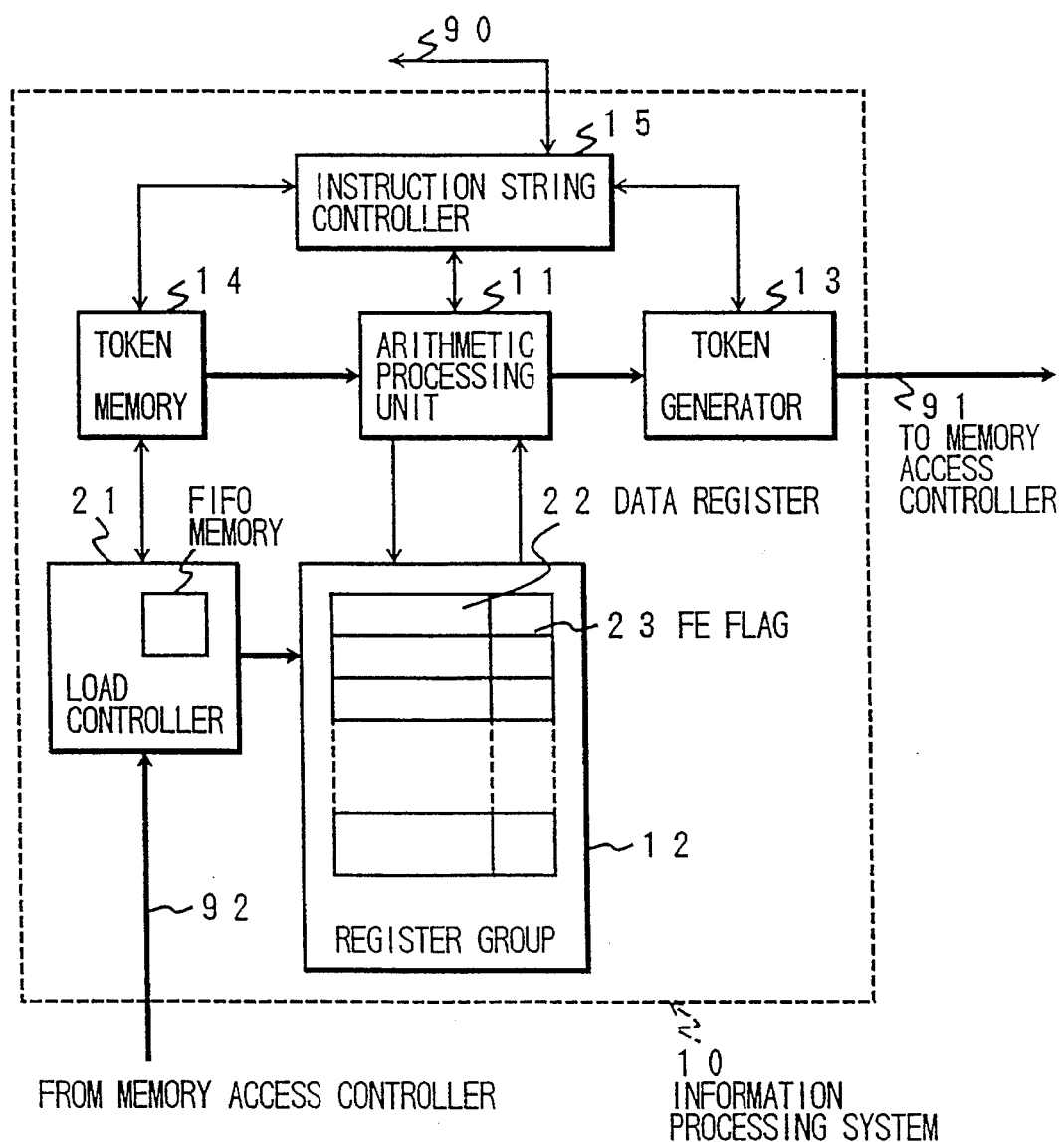
FIG. 1 is a block diagram showing the construction of the first embodiment of an information processing system according to the present invention.
Figure 2:
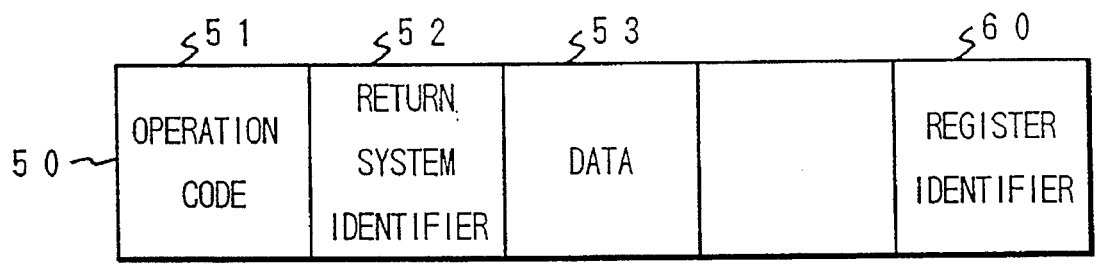
FIG. 2 is an illustration showing one example of a format of data token to be employed in the first embodiment of the information processing system.

FIG. 1 is a block diagram showing the first embodiment of an information processing system according to the present invention. As shown in FIG. 1, the information processing system 10 comprises an arithmetic processing unit 11 performing arithmetic process of instructions in an instruction string made reference to by an internal program counter with counting up the value of the program counter when the instruction string is input, a register group 12 as a group of registers to be made reference to and/or updated by the arithmetic processing unit, a token generator 13 generating a demand token from the internal instruction of the arithmetic processing unit 11 for issuing the same to an external memory access controller 20, and generating a control token for commanding resumption of execution of an instruction string when execution is interrupted, a token memory 14 storing in first-in first-out (FIFO) manner executable instruction string in a form of the control token, an instruction string controller controlling operation of the token memory 14, the arithmetic processing unit 11 and the token generator 13 and having an internal memory for storing programs, and a load controller 21 for loading data contained in data token fred from a memory access controller 20 to a corresponding data register. The arithmetic process in the information processing system 10 constructed as set forth above is progressed in the manner discussed below.

At first, a program describing overall operation is provided externally for the instruction string controller 15 via a signal line 90. Subsequently, per a plurality of instruction strings, a plurality of control tokens including an execution start address is provided for the instruction string controller 15. The program in the instruction string controller 15 is a series of instruction and the execution start address is one of the addresses. A partial string of the instruction from the execution start address to the terminating point in the program is an individual instruction string.

Figure 4:
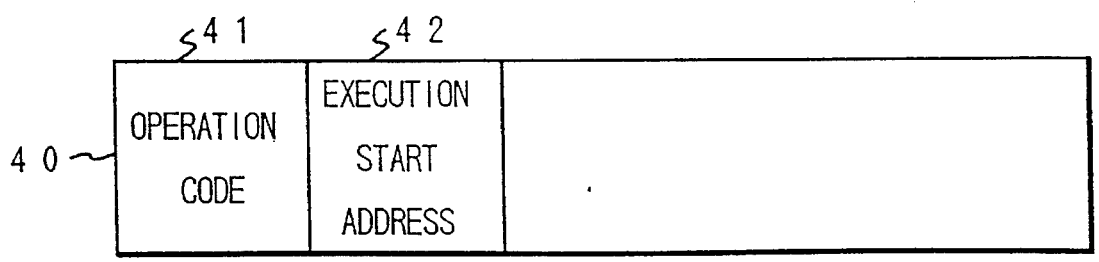
FIG. 4 is an illustration showing one example of a format of a control token to be employed in the first embodiment of the information processing system.

The control token of each individual instruction string is stored in the token memory 14 in first-in first-out manner. On the other hand, the number of token stored in the token memory 14 is set in a token number counter within the instruction string controller 15. The format of the control token stored in the token memory 14 is shown in FIG. 4. As shown in FIG. 4, the control token includes an operation code 41 and an execution address field 42 for storing the execution start address of the instruction string.

When a predetermined process initiation signal is input to the instruction string controller 15, a leading control token in the token memory 14 is transferred to the arithmetic processing unit 11. In the arithmetic processing unit 11, the value of the execution start address 42 in the control token 40 is set in the program counter. This operation is referred to as instruction string fetch operation.

Following to the instruction string fetch operation, the arithmetic processing unit 11 starts execution of execution of the corresponding instruction string from the address designated by the program counter.

As the arithmetic operation in the arithmetic processing unit 11, instruction fetch in the instruction string controller 15 is initially performed. In the instruction fetch operation, the value of the program counter is fed to the instruction controller 15. With taking the value of the program counter as an address, an instruction is read out from the instruction string in the program in the instruction controller 15 and transferred to the arithmetic processing unit 11. Subsequently, in the arithmetic processing unit 11, the process, such as arithmetic operation and so forth described in the fetched instruction is executed. After completion of the process, the value of the program counter is incremented by 1 to advance the process to execution of the next instruction. The foregoing is the basic operation in execution of the instruction.

Figure 3:
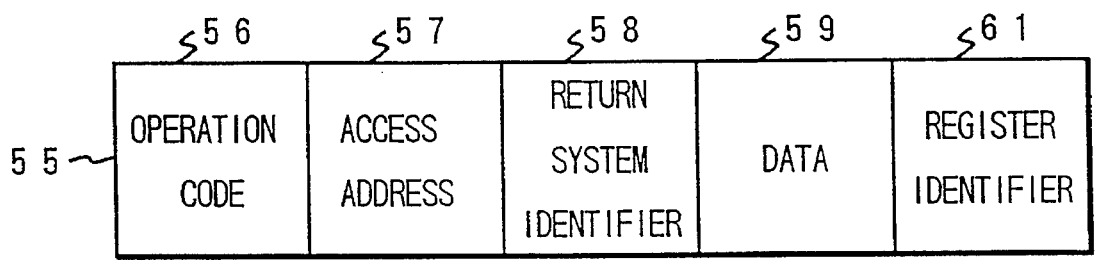
FIG. 3 is an illustration showing one example of a format of a demand token to be employed in the first embodiment of the information processing system.
Figure 6:
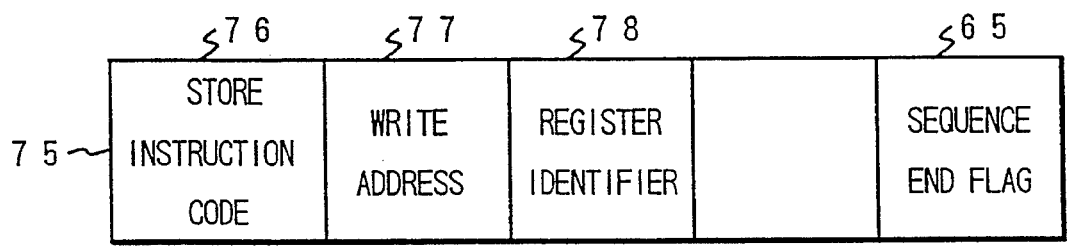
FIG. 6 is an illustration showing one example of a format of a store instruction to be employed in the first embodiment of the information processing system.

When the instruction obtained through the instruction fetch operation is a store instruction 75 for writing data on the register to a designated address in an external memory, the instruction string controller 15 issues a command to the token generator 13 to generate a demand token 55 in a format illustrated in FIG. 3. On the other hand, the format of the store instruction 75 is illustrated in FIG. 6. As seen from FIG. 6, the store instruction 75 contains an instruction code 76 indicative of the store instruction, a memory writing address 77, an identifier of the register storing the data to be writing in the memory and a sequence end flag 65.

The demand token 55 of the store instruction contains the current value of the program counter in the arithmetic processing unit 11 in an execution start address 58, the writing address 77 to the external memory in the store instruction 57 in the access address, a code designating memory writing as operation to be performed by the memory access controller 20 in an operation code 56, and a data to read out from the register designated by a field 78 of the store instruction and to be written in the external memory in a field 59.

The writing demand token 55 is transferred to the memory access controller 20 via a signal line 91. After issuing the demand token 55, the value of the program counter is incremented by 1 according to the basic operation of the program counter in the arithmetic processing unit 11. Subsequently, the arithmetic process of the instruction string is continued.

The memory access controller 20 receives the writing demand token 55, and write the data 59 in the address designated by the access address according to the operation code 56 thereof.

Figure 5:
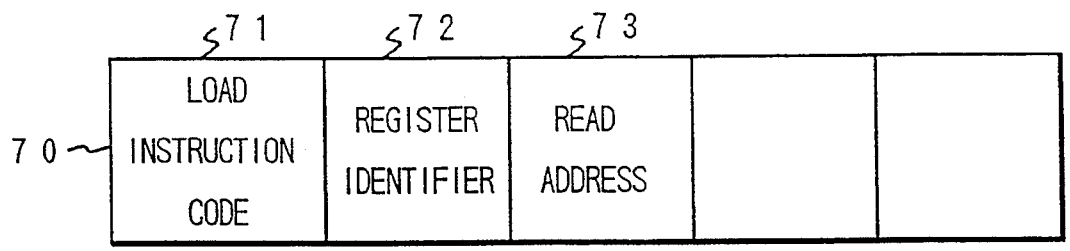
FIG. 5 is an illustration showing one example of a format of a load instruction to be employed in the first embodiment of the information processing system.

When the instruction obtained through the instruction fetch is load instruction, the token generator 13 generates the load demand token in a format shown in FIG. 3 according to the command issued from the instruction string controller 15 to the token generator 13. It should be noted that the format of the load instruction is illustrated in FIG. 5. The load instruction 70 contains an instruction code 71 indicative of the load instruction, a read out address 73 of the memory, and an identifier 72 of the data register for writing the read out data. On the other hand, the load demand token 55 contains the read out address 73 of the external memory in the load instruction 70 in a field 57, a code designating memory read as operation to be performed by the memory access controller 20 in the operation code 56, the value of the register identifier 72 in the load instruction in an identifier 61 of the register, and an identifier of the information processing system 10 in a returning system identifier 58.

The load demand token 55 generated in the token generator 13 is transferred to the memory access controller 20 via the signal line 91. In conjunction therewith, a value of a FE flag 23 corresponding to the data register designated by the register identifier 72 among the register group, is set to "0".

After issuance of the load demand token, the arithmetic processing unit 11 increments the value of the program counter by 1 according to the basic operation of the program counter. Thereafter, the arithmetic processing unit 11 fetches the instruction in the instruction string and indicative of the address made reference to by the program counter and executes an arithmetic process designated by the fetched instruction. Namely, in the shown embodiment, the next instruction is executed without waiting for completion.

The memory access controller 20 is responsive to the load demand token 55 to read out data from the address designated by the access address 57 according to the operation code thereof and feeds the read data to the information processing system 10.

At this time, the memory access controller 20 provides the value of the field 58 (return system identifier) of the received demand token 55 in a data token 50, a value read out from the memory in a data 53, the value of the register identifier 61 of the demand token in a field 60, and a code indicative of a return token in a filed 51.

The data token 50 from the memory access controller 20 is input to the information processing system 10 through a signal line 92. At this time, the following process is performed in the load controller 21.

At first, to the data register portion 22 in the register group 12 designated by the field 60, the data 53 the data token 50 is written.

Then, the FE flag 23 corresponding to the data register, for which the data is written is set to "1" to indicate that data loading is completed. It should be noted that since the writing to the register from the load controller 21 can be done simultaneously when the arithmetic processing unit 11 is in a cycle for writing in the register, the write demand is temporarily registered in FIFO memory in the load controller in such case so that writing to the register can be performed at the forthcoming first timing where the register becomes writable state.

On the other hand, upon switching the instruction sting in the arithmetic processing unit 11, initiation of execution of the new instruction string is delayed until all write demand in the FIFO memory in the load controller 21 are completed.

Figure 7:
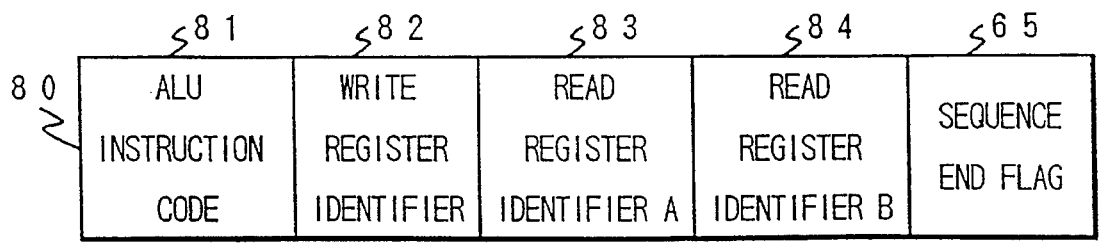
FIG. 7 is an illustration showing one example of a format of an ALU operation instruction to be employed in the first embodiment of the information processing system.

When the instruction obtained through the instruction fetch is an ALU operation instruction, the following ALU operation is performed in the arithmetic processing unit 11, for example. The format of the ALU operation instruction is illustrated in FIG. 7 and contains a read register identifier A 83 and a read register identifier B 84 indicates data register storing data to be used in the arithmetic operation, write register identifier 82 indicates the data register to store the result of the arithmetic operation. When the register to be used for the arithmetic operation is one (single term operation), the read register identifier B 84 will not be used.

Here, the register identifier is an identifier for unitarily identifying one register in a plurality of data registers in the register group 12.

Upon accessing of the register, the FE flag 23 of the register indicated by the identifier is made reference to. When both of the FE flags 23 (in case of single term operation, one of the FE flags 23 corresponding to the register to be used) are "1", data loading of the data to be used in the arithmetic operation is completed. Therefore, the ALU operation process is executed utilizing the data in the corresponding data registers 22.

Then, the program counter is incremented by 1. Thereafter, the process is advanced to execution of the next instruction in the instruction string and thus process is continued.

On the other hand, when any one of the FE flags 23 of the data registers 22 to be used for arithmetic operation is "0", it implies that the loading of the corresponding data is not yet completed. In this case, a control token 40 in a format illustrated in FIG. 4 is generated by the token generator 13. At this timing, the value of the program counter of the arithmetic processing unit 11 is written in an execution initiation address field 42. The control token 40 is stored in the token memory 14 via the instruction string controller 15.

When the instruction obtained through the instruction fetch is an instruction end instruction for terminating execution of the instruction string at the end of the instruction string, the value of the token number counter in the instruction string controller 15 is decremented by 1. When the value of the token number counter becomes "0" after decrementing, end of execution of the program is externally noticed through the signal line 90. Then, the information processing system 10 terminates operation. On the other hand, when the value of the token number counter is other than "0", the instruction string fetch is performed under the control of the instruction string controller 15, and execution of the fetched instruction string is started. When no token is present in the token memory 14, the arithmetic processing unit 10 is placed in the waiting state until the token is obtained.

FIG. 10 is a timing chart showing a sequence of the instruction execution process in the shown embodiment of the information processing system according to the present invention. Similarly to FIG. 19, in the shown example, partial instruction strings A1 (load instruction), A2 (load instruction) and A3, the ALU operation instruction A4 and a partial instruction string A5 are executed in order. In order to execute the ALU operation instruction, the data load AL1 following A1 and the data load AL2 after A2 are required. The instruction string B has the same structure.

As shown in FIG. 10, loading operation of AL1 and AL2 is performed concurrently to execution of the partial instruction strings A1, A2 and A3. When the ALU operation instruction is executed after completion of execution of the instruction string A3, since data loading for AL2 is not yet completed, switching of the instruction string is caused so as to interrupt execution of the instruction string A and initiate execution of the instruction string B. After completion of execution of the instruction string B, execution of the ALU operation instruction A4 and the partial instruction string A5 is resumed.

Figure 19:
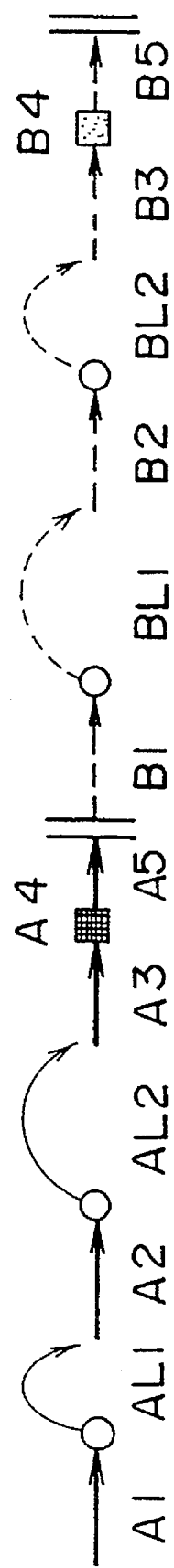
FIG. 19 is a timing chart of an instruction processing sequence of the conventional von Neumann type processor.

As shown in FIG. 10, since no inoperative state (load completion waiting state) of the arithmetic processing unit 11 will be caused even during loading operation, the process period can be remarkably shortened in comparison with the conventional von neumann type processor, the process sequence of the instruction is illustrated in FIG. 19.

Figure 8:
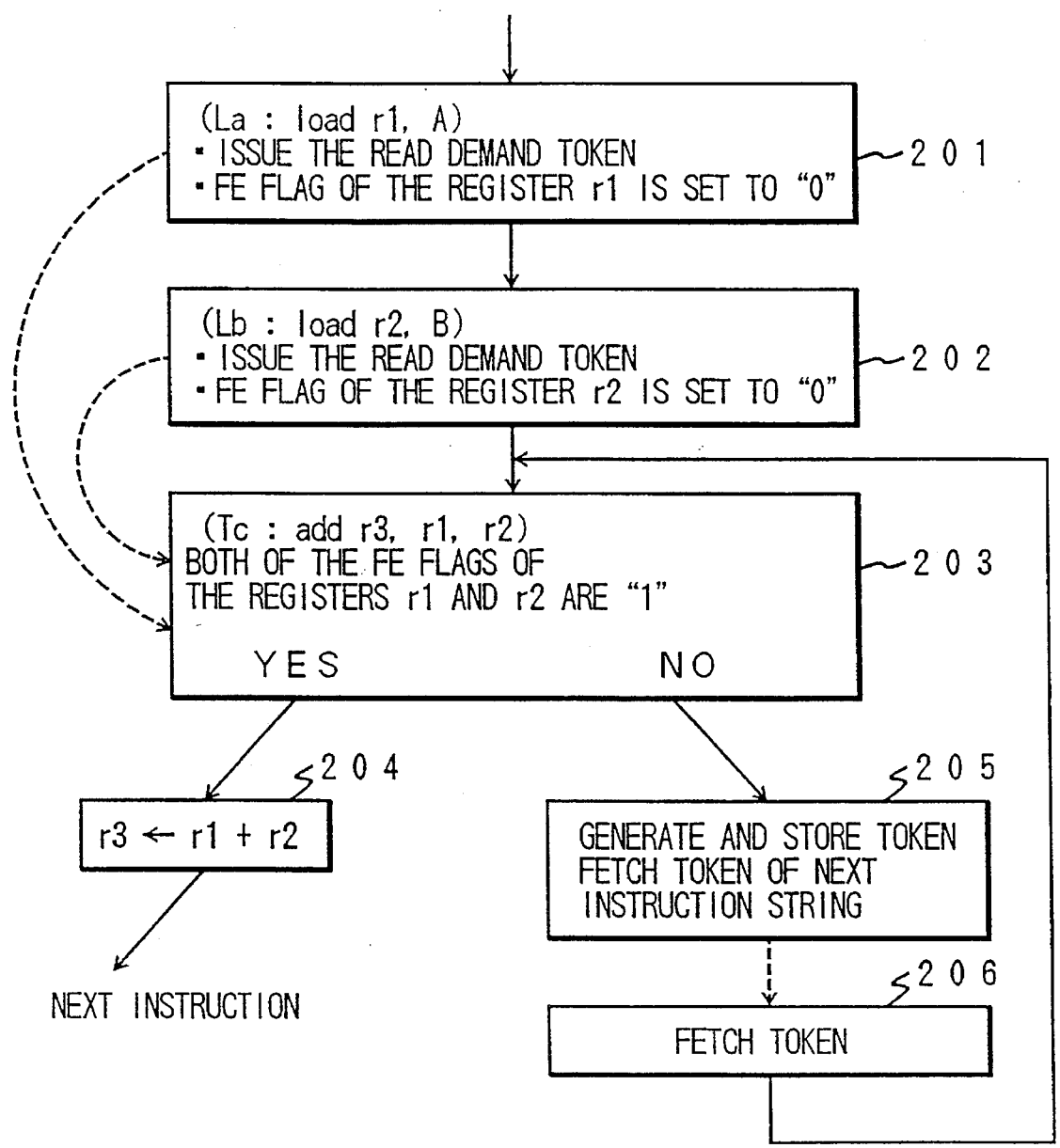
FIG. 8 is a flowchart showing an instruction processing process of the first embodiment of the information processing system.

Next, the process operation in the shown embodiment of the information processing system according to the invention will be discussed with reference to FIG. 8. Here, data read out from memory addresses A and B and loaded in the registers r1 and r2 by the load instructions La and Lb are first required in the ALU operation instruction Tc.

Figure 9:
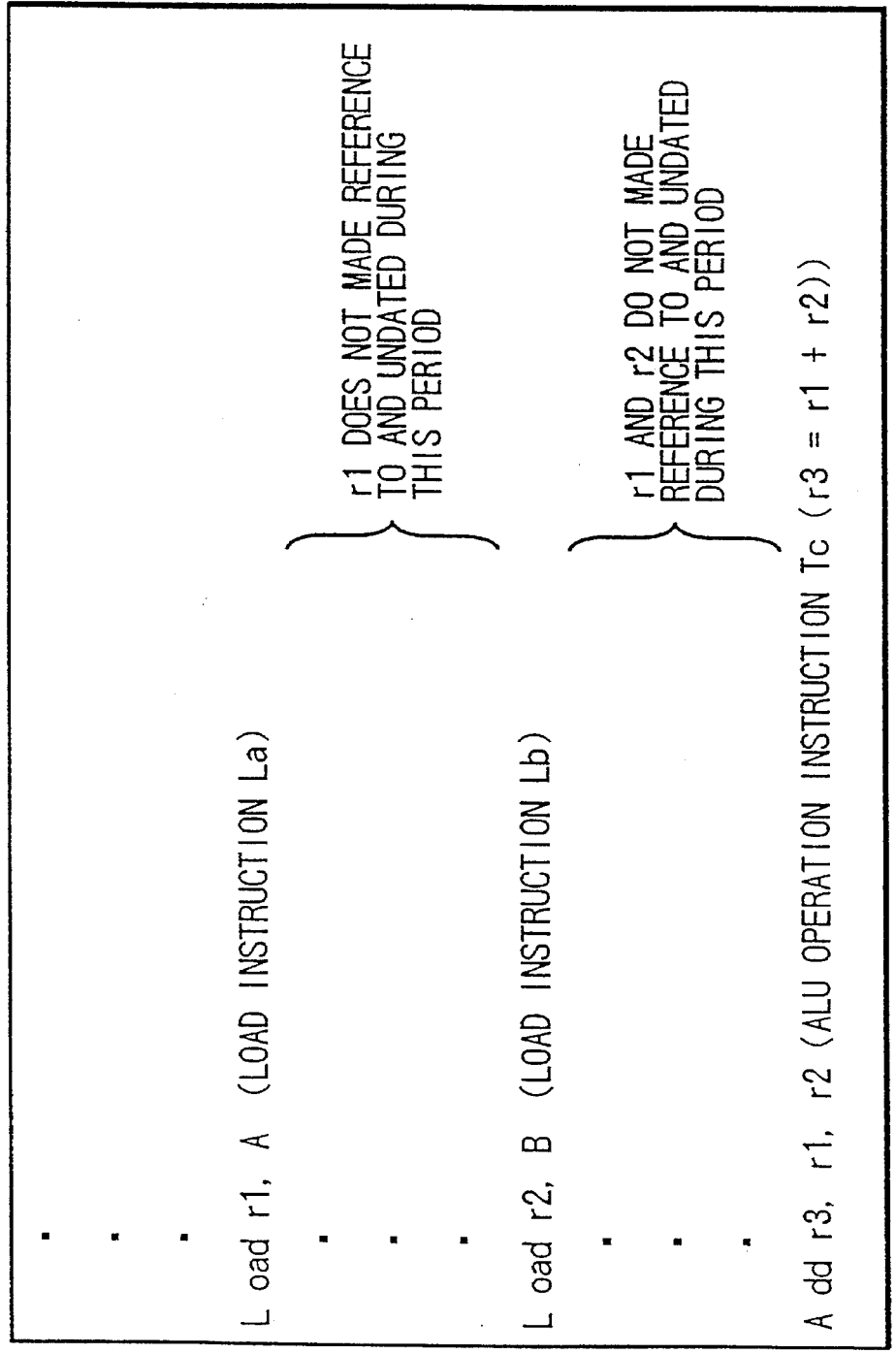
FIG. 9 is an illustration showing a concrete example of an instruction string to be executed by the first embodiment of the information processing system.

On the other hand, the instruction string is consisted of instructions as shown in FIG. 9. The followings are discussion for the state transition of the instruction string in execution of the instruction of FIG. 9.

(1) When the instruction string includes the load instruction La, the read demand token designating its load is issued, and, in conjunction therewith, the FE flag 23 of the register r1 is set to "0" in the process of the load instruction La (step 201).

(2) At this time, execution of the instruction string is continued without interruption. Namely, without waiting for completion of loading of the data in the register r1 in the process of the load instruction La, the process is instantly advanced to execution of the next instruction (load instruction Lb).

(3) Next, when the instruction string includes the load instruction Lb, the demand-token indicative of its load is issued and the FE flag 23 of the register r2 is set "0" in the processing the load instruction Lb (step 202).

(4) Also, at this time, execution of the instruction string is continued without interruption. Namely, execution of next instruction is instantly progressed without waiting for completion of loading of the data in the register r2 in the process of the load instruction Lb.

(5) Next, upon execution of the ALU operation instruction Tc, judgement is made whether both of the FE flags 23 of the registers r1 and r2 are "1" or not (step 203).

(6) If both of the FE flags 23 corresponding to the registers r1 and r2 are "1", the ALU operation instruction Tc is executed. In this case, execution of the instruction string is continued without interruption.

(7) When at least one of the FE flags 23 corresponding to the registers r1 and r2 is "0", it implies that loading of data to the corresponding one of the register r1 and r2 is not yet completed. Then, executions interrupted at the ALU operation instruction. At this time, for subsequent resumption of execution, the control token containing the value of the program counter corresponding to the ALU operation instruction (value of the program counter of the arithmetic processing unit 11 at a time of execution of the ALU operation instruction Tc) is generated and stored in the token memory 13.

(8) Then, next, the new control token of the next instruction string is fetched from the token memory 13, and execution of this new instruction string is initiated (step 205).

(9) In the token memory 13, when the order is reached that the control token including the value of the program counter of the instruction string which is once interrupted, the control token is fed to the arithmetic processing unit 11 (step 206).

(10) Then, the instruction processing of the ALU operation instruction in the interrupted instruction string is resumed (step 203). Through a sequence shown in (1) to (10), execution of the instruction string is progressed. In case of the single term operation, process is progressed according to the similar sequence.

In the foregoing, the present invention has been discussed in terms of the embodiment in which a plurality of instruction strings are processed concurrently. However, the present invention should not be specified to the concurrent processing of instruction strings but can be applicable for information processing system of parallel execution.

As set forth above, with the shown embodiment of the information processing system, when the register is made reference to by the ALU operation instruction or so forth, judgement is made whether loading for the register is completed or not so that execution of the instruction string is switched to another instruction string when the loading of the data in the register is not yet completed to execute another instruction string until the data loading in the register is completed. By this process, waiting cycles in the arithmetic processing unit can be reduced to achieve high process performance.

Figure 11:
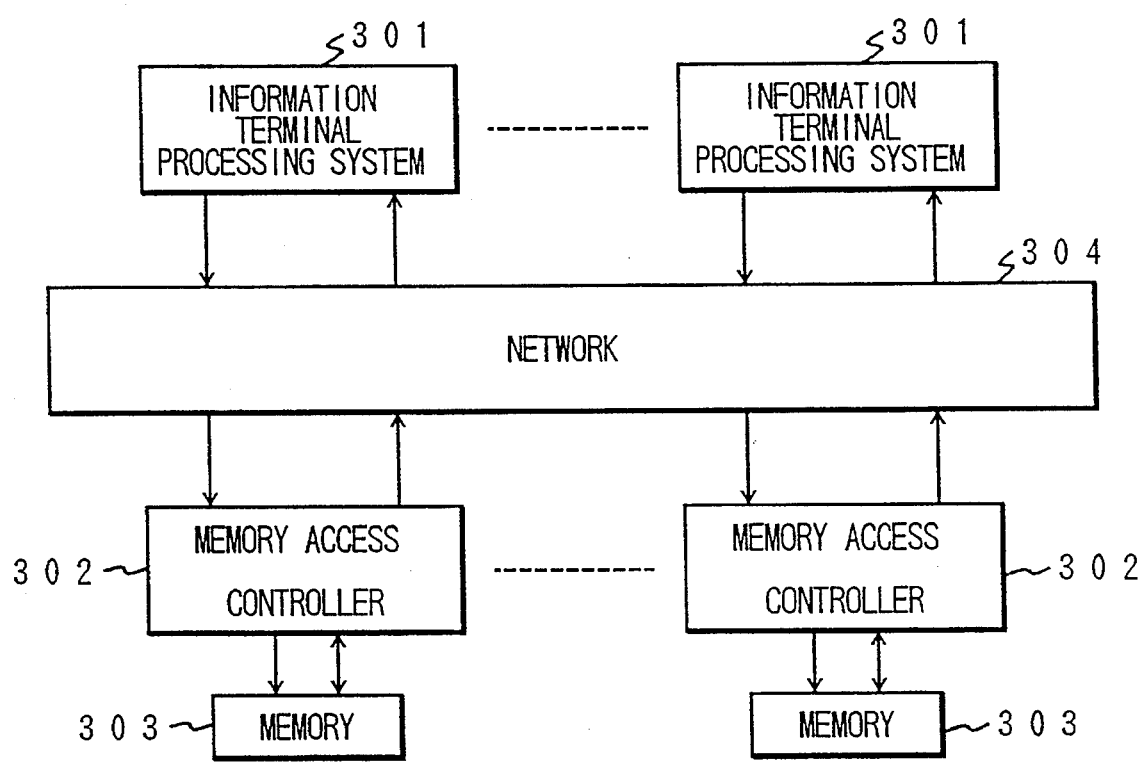
FIG. 11 is a block diagram showing a construction of the second embodiment of a parallel information processing system according to the present invention.

Next, the second embodiment of the information processing system according to the present invention will be discussed with reference to FIG. 11. FIG. 11 shows a distributed memory type parallel information processing system as the second embodiment of the present invention.

As shown in FIG. 11, the shown embodiment of the distributed memory type parallel information processing system comprises a plurality of information processing terminals 301 connected to a network 304 and executing arithmetic processes, a plurality of memories 303 respectively connected to the network 304 through memory access controllers 302.

Figure 12:
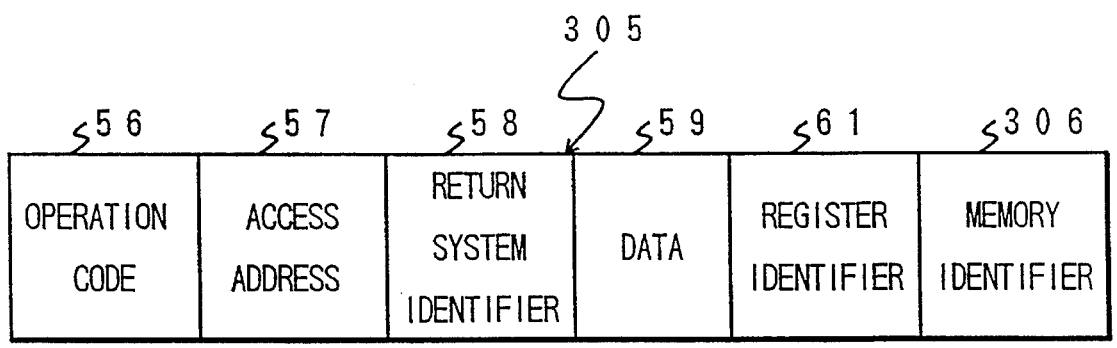
FIG. 12 is an illustration showing one example of a format of a demand token to be employed in the second embodiment of the information processing system.

Each information processing terminal 301 has the same construction to the information processing system 10 of FIG. 1. When data stored in one of a plurality of the memories 303 is to be loaded in one of the information processing terminals 301 connected to the network 304, a demand token 305 which has an identifier 306 of the memory to load the data in addition to the structure of the load demand token in the former embodiment, illustrated in FIG. 12, is fed to the network 304.

The load demand 305 is fed to the memory access controller 302 corresponding to the memory 303 identified by the memory identifier 306 via the network 304. The memory access controller 302 obtains data from the memory. Then, the memory access controller 302 generates a data token in a format illustrated in FIG. 12 and including an identifier indicative of the information processing terminal 301 which issued the demand token 305 as a return system identifier (destination), and feeds the data token to the network 304.

The data token is then transmitted to the information processing terminal 301 designated by the return system identifier. Thus, loading of the demanded data is realized.

In the shown embodiment of the distributed memory construction, each information processing terminal 302 executes next instruction without waiting for completion of data loading upon execution of load instruction for loading data from the external memory, to realize high speed processing. In case of the shown type of the network system, it is possible that number of cycles required for memory access is increased significantly depending upon variation of the load on the network or so forth. The shown embodiment avoids substantial lowering of the process performance of the distributed memory type information processing system by permitting parallel processing of data loading and other instructions. It should be noted that while FIG. 11 shows a ring type network topology, it should be appreciated as mere example showing connection in the network. Therefore, the present invention should not be specified to the shown network construction but can include other topologies. Furthermore, the invention should be applicable for various network architectures, such as LAN (Local Area Network), WAN (Wide Area Network) and so forth.

The shown embodiment of the information processing system thus remarkably improves process performance in the distributed memory type parallel information processing system, in which the number of cycles required for memory access becomes very large.

Figure 13:
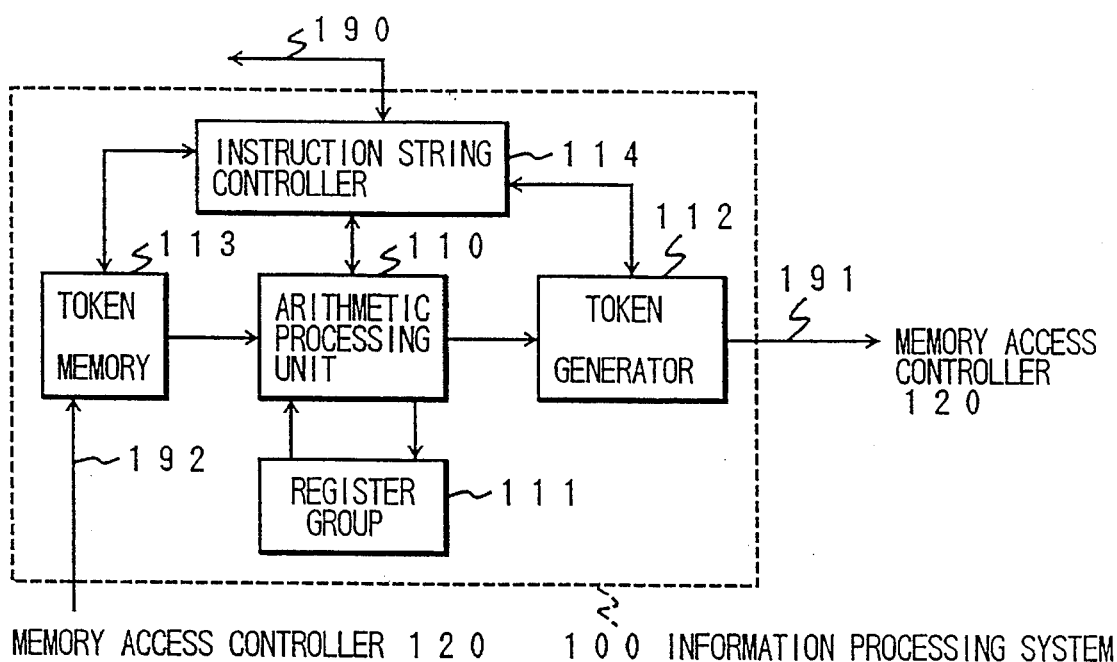
FIG. 13 is a block diagram showing a construction of the third embodiment of an information processing system according to the invention.
Figure 14:
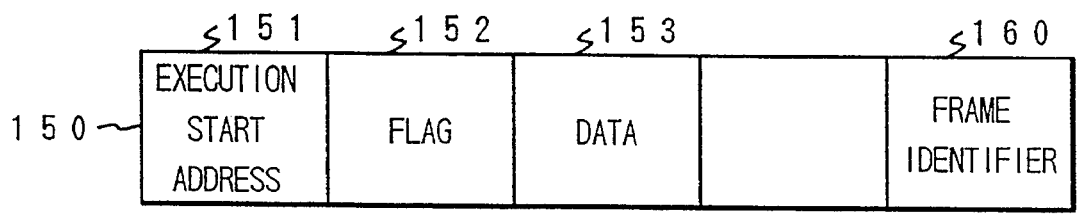
FIG. 14 is an illustration showing one example of a format of a token to be employed in the third embodiment of the information processing system.

Next, the third embodiment of the information processing system according to the present invention will be discussed with reference to FIG. 13. FIG. 13 shows the basic construction of the third embodiment of the information processing system, and FIG. 14 shows a format of a token to be used in the information processing system of FIG. 13. It should be appreciated that the format of the instruction to be executed by the shown embodiment of the information processing system is the same as that shown in FIGS. 5 to 7.

The information processing system 100, illustrated in FIG. 13, comprises an arithmetic processing unit 110 performing arithmetic process of instructions in an instruction string made reference to by an internal program counter with counting up the value of the program counter when the instruction string is input, a register group 111 as a group of registers to be made reference to and/or updated by the arithmetic processing unit 110, a token generator 112 generating a token from an instruction in the arithmetic processing unit 110 and the value of a program counter a token memory 113 storing the token input from the memory access controller 120 in first-in first-out (FIFO) manner, and an instruction string controller 114 controlling operation of the token memory 113, the arithmetic processing unit 110 and the token generator 112 and having an internal memory for storing programs.

When arithmetic process is performed employing the shown information processing system, the process is performed in the following manner. At first, a program describing overall operation is provided externally and a plurality of control tokens respectively having execution start addresses for the instruction string controller 114 via a signal line 190.

The token in the token memory 113 is in a format as shown by 150 in FIG. 14, and has a field 151 for execution start address. A field 160 is not used. The initial value of the flag 152 is "0". On the other hand, number of tokens given to the token memory 113 is set in a token number counter in the instruction string controller 114.

When a predetermined process initiation signal is input to the instruction string controller 114, a leading control token in the token memory 113 is transferred to the arithmetic processing unit 110. In the arithmetic processing unit 110, the value of the execution start address 151 in the control token 150 is set in the program counter when the value of the flag 152 is "0" and thus instruction string fetch operation is performed. Following to the instruction string fetch operation, the arithmetic processing unit 110 starts execution of execution of the corresponding instruction string from the address designated by the program counter.

In the arithmetic process in the arithmetic processing unit 110, instruction fetch is performed by feeding the value of the program counter to the instruction controller 15 and with taking the value of the program counter as an address, an instruction in the program in the instruction string controller 114. Subsequently, in the arithmetic processing unit 110, the process, such as arithmetic operation and so forth described in the fetched instruction is executed. After completion of the process, the value of the program counter is incremented by 1 through the basic operation.

As kinds of instructions obtained through the instruction fetch are ALU operation instruction, the load instruction, storing instruction as illustrated in FIGS. 5 to 7. Also, there are other instructions, such as the instruction string end instruction for terminating execution of the instruction at the end of the instruction string, and so forth.

When the instruction obtained through the instruction fetch is the ALU operation instruction, the above-mentioned basic operation is performed. The format of the ALU operation instruction is illustrated in Fig. and contains A read register identifier A 83 and a read register identifier B 84 indicates data register storing data to be used in the arithmetic operation, write register identifier 82 indicates the data register to store the result of the arithmetic operation.

Figure 15:
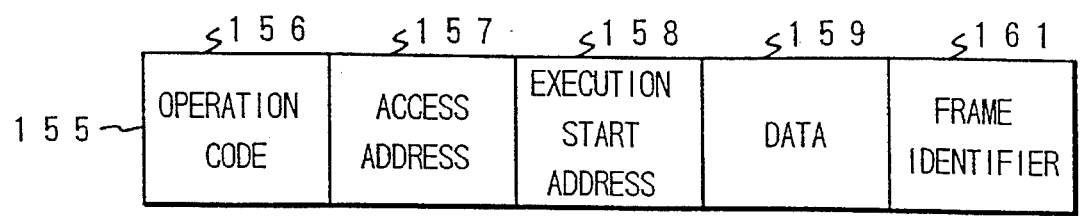
FIG. 15 is an illustration showing one example of a format of a token to be employed in the third embodiment of the information processing system.

When the instruction obtained through the instruction fetch is load instruction, the token generator 112 generates the load demand token in a format shown in FIG. 15 according to the command issued from the instruction string controller 114 to the token generator 112. It should be noted that the format of the load instruction is illustrated in FIG. 5. The load instruction 70 contains an instruction code 71 indicative of the load instruction, a read out address 73 of the memory, and an identifier 72 of the data register for writing the read out data. On the other hand, the load demand token 155 contains the value of the program counter in the arithmetic processing unit 110 in an execution start address 158, the read out address 73 of the external memory in the load instruction 70 in a field 157, a code designating memory read as operation to be performed by the memory access controller 20 in the operation code 156. A field 161 is not used. The load demand token 155 generated in the token generator 112 is transferred to the memory access controller 120 via the signal line 191. Subsequently the arithmetic processing unit 110 fetches the instruction in the instruction String under the control of the instruction string controller 114 without waiting for completion of data loading. Then, execution of the fetched instruction string is initiated. Namely, switching of the instruction string to be executed is performed.

When the instruction obtained through the instruction fetch operation is a store instruction for writing data on the register to a designated address in an external memory, the instruction string controller 114 issues a command to the token generator 112 to generate a demand token 155 in a format illustrated by 115 in FIG. 15. On the other hand, the format of the store instruction is illustrated in FIG. 6. As seen from FIG. 6, the store instruction contains an instruction code 76 indicative of the store instruction, a memory writing address 77, an identifier 78 of the register storing the data to be writing in the memory. The demand token 155 of the store instruction contains the current value of the program counter in the arithmetic processing unit 110 in an execution start address 158, the writing address 77 to the external memory in the store instruction in the field 157, a code designating memory writing as operation to be performed by the memory access controller 20 in an operation code 156, and a data to read out from the register designated by a field 78 of the store instruction and to be written in the external memory in a field 159. The field 161 is not used. The writing demand token 155 is transferred to the memory access controller 120 via a signal line 191. After issuing the demand token 155, the value of the program counter is incremented by 1 according to the basic operation of the program counter in the arithmetic processing unit 110. Subsequently, the arithmetic process of the instruction string is continued.

When the instruction obtained through the instruction fetch is an instruction end instruction for terminating execution of the instruction string at the end of the instruction string, the value of the token number counter in the instruction string controller 15 is decremented by 1. When the value of the token number counter becomes "0" after decrementing, end of execution of the program is externally noticed through the signal line 190. Then, the information processing system 100 terminates operation. On the other hand, when the value of the token number counter is other than "0", the instruction string fetch is performed under the control of the instruction string controller 114, and execution of the fetched instruction string is started. When no token is present in the token memory 113, the arithmetic processing unit 110 is placed in the waiting state until the token is obtained.

The memory access controller 120 is responsive to the load demand token 155 to write data 159 to the address designated by the access address 157 according to the operation code 156.

The data token from the memory access controller 120 is input to the information processing system 10 through a signal line 192. The format of the token is as shown by 150 in FIG. 14. The token is added in the FIFO memory of the token memory 113. At the leading end of the FIFO memory, the second token is shifted to be the leading token every time the leading token is fetched from the arithmetic processing unit 110, and shifted up in order.

In instruction fetch operation, when the value of the flag 152 of the fetched token is "1", the value of the execution start address 151 in the token is set in the program counter by the arithmetic processing unit 110. The instruction in program of the instruction string controller 113 addressed by the program counter is the load instruction executed at the last in the interrupted instruction string. Therefore, after writing data 53 of the token 50 to the register designated by the field 72 of the format of the instruction 70 in FIG. 3, the program counter is incremented and arithmetic process of the instruction string is resumed from the next instruction.

Figure 16:
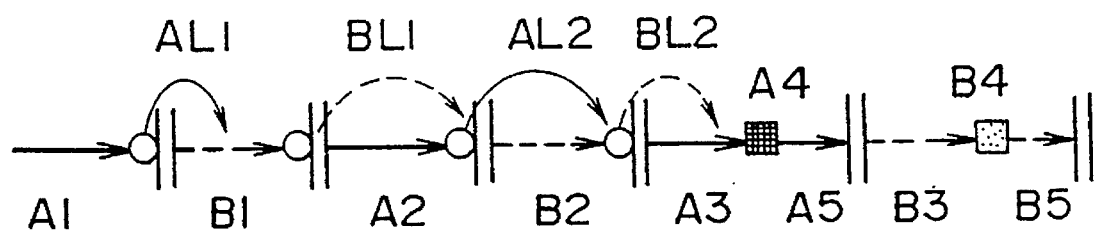
FIG. 16 is a timing chart showing an instruction processing sequence in the third embodiment of the information processing system.

FIG. 16 is a timing chart showing a sequence of the instruction execution process in the shown embodiment of the information processing system. Similarly to FIG. 19, in the shown example, partial instruction strings A1 (load instruction), A2 (load instruction) and A3, the ALU operation instruction A4 and a partial instruction string A5 are executed in order. In order to execute the ALU operation instruction, the data load AL1 following A1 and the data load AL2 after A2 are required. The instruction string B has the same structure. As shown in FIG. 16, in the shown embodiment of the information processing system, switching of the instruction string is performed immediately after issuing of the demand token in execution of each load instruction. By this process, it is successfully avoided that the arithmetic processing unit becomes inoperative in waiting of completion of loading.

In the shown embodiment, by maintaining the program counter in the token transmitted externally, execution of the instruction string can be continued when the process is resumed. On the other hand, while the load demand token is fed externally, the process of another instruction string is continued. Therefore, it becomes possible to reduce the wasting cycles in the arithmetic processing portion to maintain the process performance high.

Figure 17:
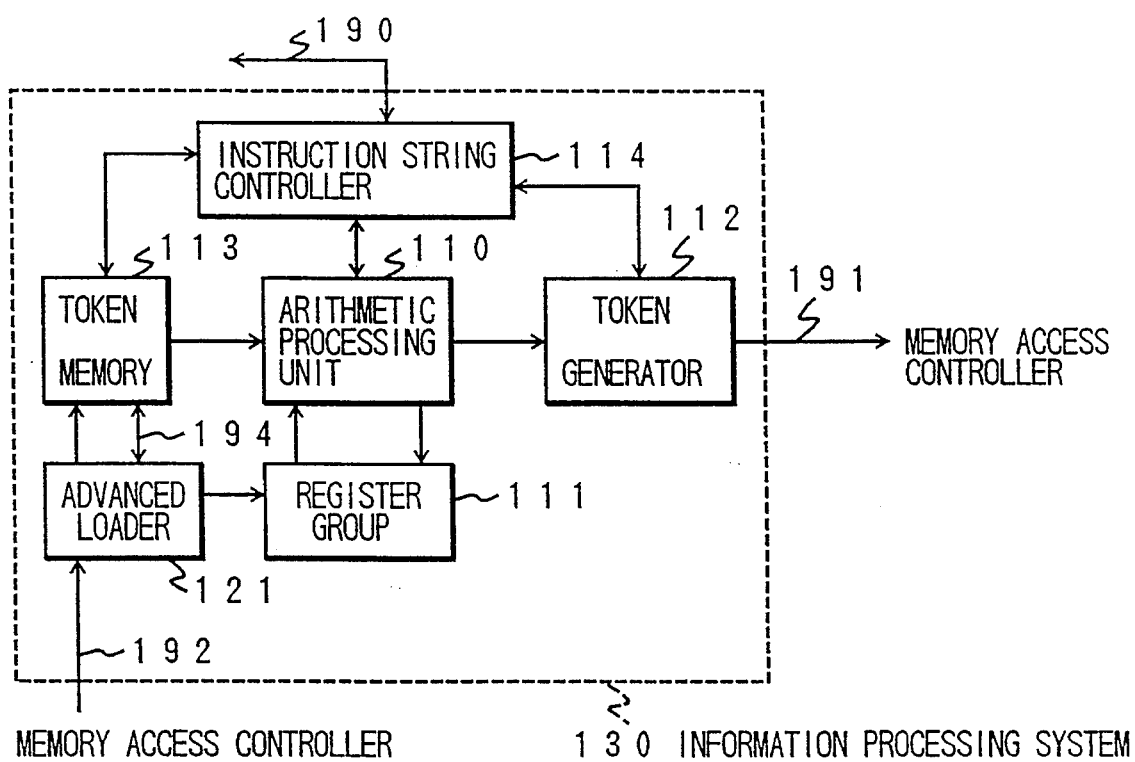
FIG. 17 is a block diagram showing a construction of the fourth embodiment of an information processing system according to the invention.

Next, the fourth embodiment of the information processing system according to the present invention will be discussed with reference to FIG. 17. The shown embodiment of the information processing system 130 includes an advanced loader 121 for writing data in the token input from the memory access controller 120 in the register in addition to the construction of the third embodiment shown in FIG. 13.

In the shown embodiment, when the token having the format of 150 in FIG. 4 and having the value "1" in the flag in the field 152 is input through the signal line 192, the following operation is performed in the advanced loader 121.

At first, the instruction in the program of the instruction string controller 114 is made reference to through signal lines 193 and 194 using the execution start address 151 in the token 150. Since the instruction is the load instruction executed at the last in the instruction string, in which the instruction is contained, the data 153 of the token 150 is written in the register in the register group 111 designated by the field 72 of the load instruction in the format of 70 in FIG. 5. It should be noted that, in the cycle where the arithmetic processing unit 110 is performing writing to the register, it is not possible to also perform Writing from the advanced loader 121. In such case, the write demand is maintained in the FIFO memory of in the advanced loader 121 so that writing can be performed at first in the writable state. On the other hand, when the instruction string is switched in the arithmetic processing portion 110, the execution of the new instruction string may be delayed to make the writing demand in the FIFO memory completed, if necessary.

Upon completion of writing, the value of the execution start address 151 is incremented, and the flag 152 is set to "0". Thereafter, the token is added to the tail end of the FiFO memory of the token memory 113.

When the instruction string is executed by fetching the token from the token memory 113 to the arithmetic processing unit 110 from the leasing one, the load operation is already completed in the advanced loader 121. Therefore, the instruction string is executed from the instruction next to the load instruction.

In this embodiment, writing of data read from the memory to the register can be completed before resuming process of the instruction string. By this, it becomes possible to use the arithmetic cycles more efficiently.

Next, discussion will be given for the fifth embodiment of the information processing system with reference to FIG. 18. The shown embodiment of the information processing system 14 has similar construction to the third embodiment of FIG. 13 but includes the register group 111 constituted of a grovel register frame 131 and N (integer greater than or equal to 2, e.g. 16) in number of local register frame 132.

The shown embodiment of the information processing system 140 limits number of tokens to be given externally upon initiation of execution of the program to less than or equal to N. By this, the number of instruction strings simultaneously present in the system is limited to be less than or equal to N. When less than or equal to N in number of tokens are externally provided upon initiation of program. the instruction string controller 114 gives mutually different frame identifiers for respective token. The frame identifier identifies one of N in number of local register frames to be occupied by the instruction string described by the toke. The token given to the token memory 113 from the instruction string controller 114 upon initiation of execution of the program has the format as illustrated by 150 in FIG. 14. The frame identifier is written in the field 160. The operation when the process start signal is given is the same as those in the third embodiment except for the following points.

When the arithmetic processing unit 110 initiates execution by fetching the token of the format 150 in FIG. 14, the value of the frame identifier 160 is stored in a frame register in the arithmetic processing unit 110 in addition to storing of the execution start address 151 in the program counter.

When the ALU operation instruction, the load instruction, the stored instruction are executed, the instructions are in formats as illustrated in FIGS. 5 to 7. The register identifier in these formats is used not only for directly identifying the register but also for identification in the frame assigned to the instruction. The register identifier indicates whether it designates the register in the grovel frame or the register in the local frames. In case it designates the grovel frame register, the remaining portion addresses one of the of the grovel frame registers. On the other hand, when the latter, one frame is identified by the frame identifier stored in the frame register in the arithmetic processing unit 110, and one of the register is addressed by the register identifier in the instruction. This is similar in the case where the token is returned from memory read out and the value read out from the memory is written in the register designated by the instruction with reference to the load instruction once again in the arithmetic processing unit 110 via the token memory 113.

Upon execution of the load instruction, storing instruction and so forth, the token generated in the token generator 112 is written the frame identifier stored in the arithmetic processing unit 110 in the field 161 of the format 155 of FIG. 15. On the other hand, when the return token (format 150) to the information processing unit 130 is generated, the value of the frame identifier of the received token is set in the corresponding field of the return token as is.

As set forth above, with the shown embodiment, it becomes possible to use different register sets for respective instruction string. Furthermore, it is possible to employ the advanced loader set out in the fourth embodiment in the shown construction.

With the shown embodiment, in addition to the effect in the third embodiment, the instruction strings are permitted to use mutually different register space to allow mutually different contexts running in the same portion of the program to be presented simultaneously. This provides higher flexibility in processing of the program.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information processing system including a plurality of instruction strings containing a plurality of instructions and progressing process by executing instructions in one of said instruction strings in order, comprising:

token storing means for storing control tokens, each being set with a start address for each instruction string;

arithmetic processing means for executing instructions in said instruction string from said start address in said control token fed from said token storing means;

a register group comprising a plurality of data registers for storing data to be accessed by said arithmetic processing means;

load controlling means for receiving loaded data and writing in a data register in said register group during execution of an instruction for loading data from an external memory;

instruction string controlling means for feeding an instruction next to instruction for loading data in said instruction string to said arithmetic processing means without waiting for completion of a load operation during execution of the instruction by said arithmetic processing means for loading data from the external memory to said data register in said register group, interrupting execution of the currently executed instruction string and feeding the control token of another instruction string to said arithmetic processing means from said token storing means and storing a control token including a resume address of the interrupted instruction string in said token storing means when data to be used for an arithmetic operation is not loaded in said data register in execution of the instruction for performing said arithmetic operation using the data in said data register;

token generating means for generating a demand token designating loading of data with respect to an access means for said external memory in response to a command of said instruction string controlling means in execution of the instruction for loading data from said external memory, and generating said control token including said resume address of the interrupted instruction signal in response to a command from said instruction string controlling means upon interruption of execution of the instruction string;

a flag indicating whether data loading is completed for a plurality of data registers in said register group, and said load controlling means sets a load completion in said flag of the data register to which the loaded data is written by the load instruction of data, and said instruction string controlling means interrupts execution of the currently executed instruction string when the flag indicates incompleteness of loading in said data register upon execution of the instruction for performing said arithmetic operation with respect to the data in the data register.

2. An information processing system as set forth in claim 1, wherein said load controlling means sets the flag of said data register in a loading incomplete state upon execution of the instruction for loading data from said external memory.

3. A distributed memory type parallel information processing system including a plurality of information processing sub-systems each having a plurality of instructions and progressing process by executing instructions in one of said instruction strings in order, and a plurality of external memories to be accessed by said information processing sub-systems through a network, comprising:

each of said information processing sub-systems comprising:

token storing means for storing control tokens, each being set with a start address, for each instruction string;

arithmetic processing means for executing instructions in said instruction string from said start address in said control token fed from said token storing means;

register group comprising a plurality of data registers for storing data to be accessed by said arithmetic processing means;

load controlling means for receiving loaded data and writing in a data register in said register group during execution of an instruction for loading data from an external memory;

instruction string controlling means for feeding an instruction next to said instruction for loading data in said instruction string to said arithmetic processing means without waiting for completion of a load operation during execution of the instruction by said arithmetic processing means for loading data from the external memory to said data register in said register group, interrupting execution of the currently executed instruction string and feeding the control token of another instruction string to said arithmetic processing means from said token storing means and storing a control token including a resume address of the interrupted instruction string in said token storing means when data to be used for an arithmetic operation is not loaded in said data register in execution of the instruction for performing said arithmetic operation using the data in said data register; and token generating means for generating a demand token designating loading of data including identification information of said external memory and said information processing sub-system with respect to an access means for said external memory in response to a command of said instruction string controlling means in execution of the instruction for loading data from said external memory.

4. A processing method in an information processing system comprising a plurality of instruction strings containing a plurality of instructions and progressing process by executing instructions in one of said instruction strings in order, comprising the steps of:

selecting one of said instruction strings on the basis of the control token having a start address and sequentially executing instructions in the selected instruction string;

generating a demand token including a description of operation for externally obtaining data and externally transmitting the demand token, upon processing a load instruction for obtaining external data;

advancing to an instruction next to the load instruction without waiting for completion of obtaining of external data in the processing of said load instruction;

receiving data externally obtained by said demand token and storing the received data in a register;

judging whether obtaining of data is completed upon execution of instruction for making reference to the data externally obtained;

interrupting execution of said instruction string when judgement is made that data is not yet obtained and generating a control token including a start address of the currently executed instruction string;

obtaining a new control token and switching execution to another instruction string different from the interrupted instruction string for initiating execution;

resuming execution of the interrupted instruction string by obtaining the control token corresponding to the interrupted instruction string after completion of obtaining of data;

providing a flag indicative of whether loading of data is completed or not for each of a plurality of data registers storing loaded data;

generating a demand token commanding loading of data for an access means of said external memory upon execution of instruction for loading data from said external memory;

advancing to an instruction next to said load instruction with setting said flag of said data register designated by said load instruction in a loading incomplete state without waiting for completion of externally obtaining data in the process of said load instruction;

setting the flag of the data register written with the loaded data by the load instruction of the data in a load completed state; and interrupting execution of the currently executed instruction string when the flag of said data register in a loading incomplete state upon execution of instruction for performing arithmetic operation with respect to the data in said data register.

5. A distributed memory type parallel information processing system including a plurality of information processing sub-systems each having a plurality of instructions and progressing process by executing instructions in one of said instruction strings in order, and a plurality of external memories to be accessed by said information processing sub-system through a network, comprising:

each of said information processing sub-systems including:

token storing means for storing control tokens, each being set a start address for each instruction string;

arithmetic processing means for executing instructions in said instruction string from said start address in said control token fed from said token storing means;

a register group comprising a plurality of data registers for storing data to be accessed by said arithmetic processing means;

load controlling means for receiving loaded data and writing in data register in said register group during execution of an instruction for loading data from an external memory;

instruction sting controlling means for feeding an instruction next to said instruction for loading data in said instruction string to said arithmetic processing means without waiting for completion of a load operation during execution of the instruction by said arithmetic processing means for loading data from the external memory to said data register in said register group, interrupting execution of the currently executed instruction string and feeding the control token of another instruction string to said arithmetic processing means from said token storing means and storing a control token including a resume address of the interrupted instruction string in said token storing means when data to be used for an arithmetic operation is not loaded in said data register in execution of the instruction for performing said arithmetic operation using the data in said data register; and token generating means for generating a demand token designating loading of data including identification information of said external memory and said information processing sub-system with respect to an access means for said external memory in response to a command of said instruction string controlling means in execution of the instruction for loading data from said external memory, said token generating means for generating a demand token designating loading of data with respect to an access means for said external memory in response to a command of said instruction string controlling means in execution of the instruction for loading data from said external memory, and generating said control token including said resume address of the interrupted instruction signal in response to a command from said instruction string controlling means upon interruption of execution of the instruction string; and a flag indicative of whether data loading is completed for a plurality of data registers in said register group, said load controlling means sets a load completion in said flag of the data register to which the loaded data is written by the load instruction of data, and said instruction string controlling means interrupts execution of the currently executed instruction string when the flag indicates incompleteness of loading in said data register upon execution of the instruction for performing said arithmetic operation with respect to the data in the data register.

6. A processing method in an information processing system comprising a plurality of instruction strings containing a plurality of instructions and progressing process by executing instructions in one of said instruction strings in order, comprising steps of:

selecting one of said instruction strings on the basis of the control token having a start address and sequentially executing instructions in the selected instruction string;

generating a demand token including a description of operation for externally obtaining data and externally transmitting the demand token, upon processing a load instruction for obtaining external data;

advancing to an instruction next to the load instruction without waiting for completion of obtaining of external data in the processing of said load instruction;

receiving data externally obtained by said demand token and storing the received data in a register;

judging whether obtaining of data is completed upon execution of an instruction for making reference to the data externally obtained;

interrupting execution of said instruction string when judgement is made that data is not yet obtained and generating a control token including a start address of currently executed instruction string;

obtaining new control token and switching execution to another instruction string different from the interrupted instruction string for initiating execution; and resuming execution of the interrupted instruction string by obtaining the control token corresponding to the interrupted instruction string after completion of obtaining of data.

7. A processing method as set forth in claim 6, further including:

providing a flag indicative whether data loading is completed for a plurality of data registers storing loaded data;

setting the flag of the data register written with the loaded data by the load instruction of the data in a load completed state and interrupting execution of the currently executed instruction string when the flag of said data register indicates a loading incomplete state upon execution of the instruction for performing arithmetic operation with respect to the data in said data register.

8. A processing method as set forth in claim 7, wherein said flag of said data register designated by the load instruction is set in the loading incomplete state upon execution of instruction for loading data from an external memory.

9. An information processing system having a plurality of instruction strings containing a plurality of instructions and progressing process by executing instructions in one of said instruction strings in order, comprising:

token storing means for storing control tokens, each being set with a start address for each instruction string;

arithmetic processing means for executing instructions in said instruction string from said start address in said control token fed from said token storing means;

a register group comprising a plurality of registers for storing data to be accessed by said arithmetic processing means;

load controlling means for receiving loaded data and writing in a data register in said register group during execution of an instruction for loading data from an external memory; and instruction string controlling means for feeding an instruction next to said instruction for loading data in said instruction string to said arithmetic processing means without waiting for completion of a load operation during execution of the instruction by said arithmetic processing means for loading data from the external memory to said data register in said register group, interrupting execution of the currently executed instruction string and feeding the control token of another instruction string to said arithmetic processing means from said token storing means and storing a control token including a resume address of the interrupted instruction string in said token storing means when data to be used for arithmetic operation is not loaded in said data register in execution of the instruction for performing an arithmetic operation using the data in said data register.

10. An information processing system as set forth in claim 9, which further comprises token generating means for generating a demand token designating loading of data to memory access means for loading data from said external memory in response to a command of said instruction string controlling means in execution of the instruction for loading data from said external memory, and generating said control token including said resume address of the interrupted instruction string in response to a command from said instruction string controlling means upon interruption of execution of the instruction string.

11. An information processing system as set forth in claim 10, wherein said arithmetic processing means includes a program counter and wherein said token generating means sets a value of said program counter in said arithmetic processing means at a time of interruption of the execution of the instruction string as said resume address to be contained in said control token.

12. An information processing system as set forth in claim 9, wherein each of the data registers in said register group includes a flag indicating whether data loading to said data register is completed or not, and said load controlling means sets a loading incomplete state in said flag of the data register to which the loaded data is written by the load instruction of data, and said instruction string controlling means interrupts execution of the currently executed instruction string when the flag indicates an incomplete data loading in said data register upon execution of the instruction for performing an arithmetic operation with respect to the data in the data register.

13. An information processing system as set forth in claim 12, wherein said instruction processing means sets the flag of said data register in loading incomplete state upon execution of the instruction for loading data from said external memory.

* * * * *